Patented Nov. 13, 1934

1,980,774

UNITED STATES PATENT OFFICE 1,980,774

MANUFACTURE OF GOODS OF OR CONTAINING RUBBER OR THE LIKE

Douglas Frank Twiss, Wylde Green, and Edward Arthur Murphy, Erdington, Birmingham, England, assignors to Dunlop Rubber Company, Limited, Birmingham, England, a British corporation No Drawing. Application March 31, 1931, Serial No. 526,767. In Great Britain May 21, 1930

7 Claims. (Cl. 18—50)

This invention relates to improvements in the manufacture of goods of or containing rubber or the like.

The object of our present invention is to increase the life of rubber articles and to prevent or retard the aging of india rubber.

In our invention, we employ for the above purpose a concentrated serum remaining after the removal by centrifugal or equivalent means a greater or lesser part of the dispersed rubber particles of the latex. The removal and concentration of the rubber particles from a rubber latex by centrifugal means is described, for example, in British patent to Utermark No. 219,635, in which the latex is separated by suitable manipulation in a centrifugal separator into a concentrated portion containing an increased quantity of the dispersed rubber particles and into a "skim" containing a less percentage of the dispersed rubber particles but with an undiminished percentage of the soluble constituents of the latex, and, therefore, containing these constituents in relatively greater proportion to the rubber constituents.

In our present invention this "skim" portion, containing a smaller proportion of rubber than the artificial latex, is further concentrated by evaporation either to dryness or to a thick liquid and may then be added to a rubber latex or compounded with rubber material, or used directly, because of its rubber content, as a rubber material for producing rubber goods.

According to the present invention, the properties of goods of or containing rubber or the like are improved by the preparation of the aforesaid goods directly from, or by the admixture into rubber compositions or aqueous dispersions thereof of the concentrated latex serum obtained by the subsequent further concentration of the skim resulting from the concentration of latex by centrifuging.

The concentrated latex skim thus obtained is free from contamination of acid and, moreover, the skim contains about 6% to 8% rubber and almost the same proportion of serum solids, thereby yielding a concentrated rubber product containing rubber with a very much larger proportion of serum solids than is to be obtained in ordinary rubber.

According to conditions of concentration of the skim the product may be obtained in powder form or in the form of a viscous syrup. Desiccation by spraying normally yields a product of the former type while evaporation particularly according to the process described and claimed in Patent No. 1,846,164 yields a syrup.

In order to prevent coagulation of any of the rubber or protein constituents during the concentration of the skim by evaporation the temperature of the mass during evaporation should be kept low, that is, below 70° C.

Additional substances may be introduced before or during the concentration processes in order to increase the stability of the concentrate during the process and afterwards or to secure the presence of desirable compounding ingredients. Similar additions for the latter purpose may be made before or during desiccation by a spraying process.

The product obtained may be used as an addition, for incorporation into rubber or rubber latex intended for the production of rubber articles. It may also be used as a material for the production of articles by moulding or as an addition to various moulding powders consisting of or containing rubber and the like.

This liquid concentrated skim may also be used for mixing in suitable proportions with the concentrated latex produced by the same process, i. e. centrifuging, as that which yielded the original dilute "skim", thereby producing a "whole" concentrate containing all the original constituents of the natural latex, preferably in the correct proportions.

An example of carrying the invention into effect is as follows:—

30 lbs. of the residual "skim" obtained in the production of concentrated latex according to British Patent No. 219,635, is placed in a concentrator of the type described and claimed in British Patent No. 307,315. The skim contained 11% of total solids. Ammonia is added to the extent of 0.5% on the whole and the liquid is concentrated at a temperature not exceeding 65° C. until the total solid content reaches 50%. The product is cooled and the thick creamy fluid is then treated with 0.5% ammonia for preservative purposes.

It will be understood that by the term "rubber materials" is meant not only caoutchouc of natural origin, but similar materials of natural or artificial origin and other compounding ingredients and substitutes normally used in rubber materials.

What we claim is—

1. A dry powdered rubber material which comprises a concentrated uncoagulated latex serum containing a smaller proportion of rubber materials to the soluble constituents of said latex.

2. A method of concentrating latex which comprises mechanically separating said latex into two portions, one containing an increased percentage of dispersed material and the other a lesser percentage of dispersed material, concentrating the latter portion by evaporation and adding it to the portion containing an increased proportion of dispersed material.

3. A method of concentrating latex which comprises centrifugally separating said latex into a portion containing an increased proportion of dispersed material and a portion containing a lesser proportion of dispersed material, concentrating said second portion by evaporation and adding it to said first portion.

4. A method of concentrating an aqueous rubber dispersion which comprises centrifugally separating said dispersion into a portion containing an increased proportion of dispersed material and a portion containing a decreased proportion of dispersed material, concentrating said second portion by evaporating water therefrom at low temperatures, and adding it to said first portion.

5. A dry powdered rubber material free from coagulants which comprises a concentrated uncoagulated latex serum containing a smaller proportion of rubber materials to the soluble constituents of said latex.

6. A method of making a "whole" latex concentrate containing all the original constituents of the natural latex which comprises incorporating a suitable portion of a concentrated latex serum remaining from the concentration of latex by centrifuging into a concentrated latex obtained by centrifuging.

7. A method of making a "whole" latex concentrate containing all the original constituents of the natural latex in the correct proportions which comprises incorporating the correct proportions of a concentrated latex serum remaining from concentration of latex by centrifuging into a concentrated latex obtained by centrifuging.

DOUGLAS FRANK TWISS.
EDWARD ARTHUR MURPHY.